(12) United States Patent
Richards et al.

(10) Patent No.: US 9,843,171 B2
(45) Date of Patent: Dec. 12, 2017

(54) MCC UNIT TROUBLESHOOTING COMPARTMENT

(71) Applicant: SCHNEIDER ELECTRIC USA, INC., Schaumburg, IL (US)

(72) Inventors: Walter J. Richards, Murfreesboro, TN (US); Manuel Antonio Becerra Becerra, Apodaca (MX); Viviana Guadalupe Ornelas Reyes, General Escobedo (MX); Gary M. Rosen, Lascassas, TN (US); Jonathan Hastings, Clemson, SC (US)

(73) Assignee: SCHNEIDER ELECTRIC USA, INC., Andover, MA (US)

( * ) Notice: Subject to any disclaimer, the term of this patent is extended or adjusted under 35 U.S.C. 154(b) by 0 days.

(21) Appl. No.: 15/024,228

(22) PCT Filed: Sep. 30, 2013

(86) PCT No.: PCT/US2013/062563
§ 371 (c)(1),
(2) Date: Mar. 24, 2016

(87) PCT Pub. No.: WO2015/047375
PCT Pub. Date: Apr. 2, 2015

(65) Prior Publication Data
US 2016/0248232 A1 Aug. 25, 2016

(51) Int. Cl.
*H02B 1/32* (2006.01)
*H02B 1/36* (2006.01)
*H02B 1/38* (2006.01)

(52) U.S. Cl.
CPC ............... *H02B 1/32* (2013.01); *H02B 1/36* (2013.01); *H02B 1/38* (2013.01)

(58) Field of Classification Search
CPC ............... H02B 1/32; H02B 1/38; H02B 1/36
(Continued)

(56) References Cited

U.S. PATENT DOCUMENTS 3,142,003 A 7/1964 Olashaw
3,626,253 A 12/1971 Sturdivan
(Continued)

FOREIGN PATENT DOCUMENTS

WO 2011000838 A1 1/2011

OTHER PUBLICATIONS

International Search Report and Written Opinion dated Mar. 10, 2014 in PCT/US13/62563, 17 pp.
(Continued)

*Primary Examiner* — Anthony Haughton
*Assistant Examiner* — Yahya Ahmad
(74) *Attorney, Agent, or Firm* — Locke Lord LLP (57) ABSTRACT

A troubleshooting compartment for a motor control center unit, provides electrical access to test control points inside the motor control center unit, without exposing the operator to electrical hazards from the main line-voltage components inside the motor control center unit. The troubleshooting compartment comprises an accessible compartment contained within a motor control center unit, which is separate from a main line-voltage compartment of the motor control center unit, the accessible compartment having an access side to enable operator access to the accessible compartment without need to open the main line-voltage compartment; an accessible compartment door covering the access side of the accessible compartment from a front side of the motor control center unit; and feed-through terminals mounted within the accessible compartment, for test points and pilot devices operating at low, control voltages.

3 Claims, 6 Drawing Sheets

(58) Field of Classification Search
USPC .............................. 361/622–626; 324/76.11
See application file for complete search history.

(56) References Cited

U.S. PATENT DOCUMENTS

| | | | |
|---|---|---|---|
| 4,139,748 | A | 2/1979 | Wolfe et al. |
| 4,768,967 | A | 9/1988 | Fritsch |
| 4,789,919 | A | 12/1988 | Cox et al. |
| 5,486,663 | A | 1/1996 | Fritsch et al. |
| 5,510,960 | A * | 4/1996 | Rosen .................. H01R 9/2425 361/624 |
| 6,337,449 | B1 | 1/2002 | Brouillat et al. |
| 6,472,971 | B2 | 10/2002 | Toyama et al. |
| 6,486,421 | B1 | 11/2002 | Jones et al. |
| 6,954,060 | B1 | 10/2005 | Edel |
| 7,688,572 | B2 | 3/2010 | Yee et al. |
| 7,795,551 | B2 | 9/2010 | Narayanan et al. |
| 8,199,022 | B2 | 6/2012 | Morris et al. |
| 8,305,739 | B2 | 11/2012 | Dozier |
| 8,331,081 | B2 | 12/2012 | Abrahamsen et al. |
| 8,333,600 | B2 | 12/2012 | Yanniello |
| 8,476,992 | B2 | 7/2013 | Yang et al. |
| 8,514,551 | B2 | 8/2013 | Cosley |
| 9,123,488 | B2 | 9/2015 | Seo |
| 2007/0111575 | A1 * | 5/2007 | Jensen ................ H01R 13/6315 439/246 |
| 2008/0079436 | A1 * | 4/2008 | Gollhardt ............. H02B 13/025 324/457 |
| 2008/0258667 | A1 * | 10/2008 | Morris .................... G01R 1/04 318/490 |
| 2010/0024191 | A1 | 2/2010 | Ledbetter |
| 2010/0084920 | A1 | 4/2010 | Banting et al. |
| 2010/0118473 | A1 | 5/2010 | Morris et al. |
| 2010/0280775 | A1 | 11/2010 | Schafer et al. |
| 2011/0110049 | A1 * | 5/2011 | Lehtola ................ H05K 7/1409 361/724 |
| 2011/0149480 | A1 * | 6/2011 | Leeman .................... H02B 1/36 361/608 |
| 2011/0252845 | A1 | 10/2011 | Webb et al. |
| 2011/0285483 | A1 | 11/2011 | Morris et al. |
| 2011/0299228 | A1 | 12/2011 | Milovac et al. |
| 2012/0039061 | A1 | 2/2012 | McBee et al. |
| 2012/0064746 | A1 | 3/2012 | Bellow et al. |
| 2012/0127636 | A1 | 5/2012 | Abrahamsen et al. |
| 2012/0228097 | A1 | 9/2012 | Gemme et al. |
| 2013/0088812 | A1 | 4/2013 | Yee et al. |
| 2015/0171605 | A1 | 6/2015 | Jo et al. |
| 2016/0036204 | A1 | 2/2016 | Schroeder |
| 2016/0248232 | A1 * | 8/2016 | Richards .................. H02B 1/36 |

OTHER PUBLICATIONS

"Model 6 Export Motor Control Centers," Instruction Bulletin 80446-300-01A, Square D. Company, Oct. 2001, 66 pp.
"Model 6 Motor Control Center with Altivar AC Drives", Square D. Brochure, Document No. 8998HO1201, Sep. 2012, 2pp.
Model 6 Export Motor Control Centers, Bulletin No. 80446-300-01A, Square D Company, Oct. 2001.

* cited by examiner

MCC UNIT TROUBLESHOOTING COMPARTMENT

FIELD OF THE INVENTION

The invention is generally directed to a motor control center unit.

BACKGROUND OF THE INVENTION

A motor control center, also referred to as an MCC, is generally a cabinet-like structure that is divided into modular sections designed to accept a plurality of component motor control center units, also referred to as MCC units. An MCC unit is generally a drawer-like container of electrical components, such as circuit breakers, motor starters, relays, power meters, programmable logic controllers, and other control circuit components used for electrical power distribution in industrial and commercial applications. The MCC unit slides into an MCC section and plugs into a common power bus running vertically along the back side of the MCC section. The MCC unit includes a connector, also referred to as a stab assembly or stabs, arranged on the back side of the unit, to plug into the power bus.

When an MCC unit is serviced, it is of utmost importance to prevent the operator from being exposed to electrical shocks and arc flash hazards, collectively "electrical hazards." In existing motor control center units, such as is disclosed in the prior art U.S. Pat. No. 8,199,022, electrical feed-through terminals on the front panel of a motor control center unit, convey test signals from internal test points, to enable troubleshooting without opening the front panel. When not in use, the patent describes that the terminals may be covered by a metal arc flash resistant cover. However, there is no flexibility in expanding or modifying the test point terminals without drilling or machining the front panel of the prior art MCC unit. Moreover, there is no provision for installing or modifying pilot devices in the front panel of the prior art motor control center unit, such as pilot lights, push buttons, selector switches, or other control devices.

SUMMARY OF THE INVENTION

The troubleshooting compartment for a motor control center unit, is accessible by an operator without exposing the operator to electrical hazards from high power electrical components inside the motor control center unit. The troubleshooting compartment provides flexibility in expanding or modifying feed-through terminals and enables installing or modifying pilot devices, such as pilot lights, push buttons, selector switches, or other control devices, both during the manufacture of customized motor control center units and during field modification of motor control center units.

There are two example embodiments of the invention, both of which comprise a troubleshooting compartment contained within the motor control center unit, which is separate from the main line-voltage compartment of the motor control center unit. In both embodiments, the troubleshooting compartment includes a hinged door covering an access to the troubleshooting compartment from the front of the motor control center unit, to enable operator access to the troubleshooting compartment without need to open the main line-voltage compartment. In both embodiments, the troubleshooting compartment includes feed-through terminals for test points and pilot devices operating at low, control voltages presenting less of an electrical hazard. Feed-through terminals may be metal conductors connected to low voltage test points within the main line-voltage compartment. Feed through terminals pass through the wall of the troubleshooting compartment and present a contacting surface that is available for probing with an instrument, such as a frequency counter or voltmeter. Pilot devices are low voltage devices that may include pilot lights, push buttons, selector switches, or other control devices connected to low voltage test points within the main line-voltage compartment. The pilot devices may be options and configurations chosen by customers or engineers to monitor or control the main line-power components in the motor control center unit. In both embodiments, the troubleshooting compartment provides flexibility in expanding or modifying feed-through terminals and enables installing or modifying pilot devices, both during the manufacture of customized motor control center units and during field modification of motor control center units.

In the first example embodiment of the invention, a troubleshooting compartment structure has a generally box-like shape with an access side mounted in an aperture of a front door of the motor control center unit. The access side of the troubleshooting compartment structure is accessible by an operator through the aperture in the front door of the motor control center unit. The compartment structure is configured to provide separation and protection from electrical power components inside the main low-voltage compartment.

In the first example embodiment of the invention, a troubleshooting compartment door is mounted by a hinge on the troubleshooting compartment structure, covering the aperture in the front door. The compartment door is configured to be opened by the operator independently from the front door of the motor control center unit.

In the first example embodiment of the invention, a plurality of feed-through electrical terminals are mounted on an electrical terminal block in the troubleshooting compartment structure. The terminals are configured to be accessible by the operator through the aperture in the front door of the motor control center unit, to provide electrical access to test control points of electrical components inside the main line-voltage compartment. The operator's access may be accomplished without exposing the operator to electrical hazards from the electrical components inside the main line-voltage compartment.

The troubleshooting compartment provides flexibility in expanding or modifying the feed-through terminals and enables installing or modifying pilot devices, both during the manufacture of customized motor control center units and during field modification of motor control center units.

In the second example embodiment of the invention, the motor control center unit is divided into two compartments, the troubleshooting compartment and the main line-voltage compartment. Both of the compartments have a respective and mutually independent front door. The troubleshooting compartment has a generally box-like shape with an access side in the front of the motor control center unit. The access side of the troubleshooting compartment is accessible by an operator through the front of the motor control center unit. The troubleshooting compartment has a compartment divider to provide separation and protection from electrical hazards in the main line-voltage compartment of the motor control center unit.

In the second example embodiment of the invention, a troubleshooting compartment door is mounted by a hinge at the front of the motor control center unit, covering the access side of the compartment. The troubleshooting compartment door is configured to be opened by the operator independently from the front door of the motor control center unit.

In the second example embodiment of the invention, a plurality of feed-through electrical terminals are mounted on an electrical terminal block in the troubleshooting compartment. The feed-through terminals are configured to be accessible by the operator through the access side in the front of the motor control center unit. The feed-through terminals provide electrical access to test control points of electrical components in the main line-voltage compartment of the motor control center unit, without exposing the operator to electrical hazards from the electrical components inside the motor control center unit.

The troubleshooting compartment provides flexibility in expanding or modifying the feed-through terminals and enables installing or modifying pilot devices, both during the manufacture of customized motor control center units and during field modification of motor control center units. In this manner, the electrical components within the motor control center unit may thus be safely tested without exposing the operator to an electrical hazard.

BRIEF DESCRIPTION OF THE DRAWINGS

Example embodiments of the invention are depicted in the accompanying drawings that are briefly described as follows:

FIG. 1D is a generalized circuit schematic diagram and top cross sectional view of an example embodiment of the invention shown in FIG. 1A. The figure shows the structure of the troubleshooting compartment having a generally box-like shape with one side being the access side, the troubleshooting compartment structure being mounted in an aperture of the front door of the motor control center unit. The figure further schematically shows example feed-through electrical terminals being mounted on the electrical terminal block inside the troubleshooting compartment structure, connected to test control points inside the main line-voltage compartment, without exposing the operator to electrical hazards from the main line-voltage components inside the motor control center unit.

DETAILED DESCRIPTION OF THE EXAMPLE EMBODIMENTS

A troubleshooting compartment 1 for a motor control center unit 20, is accessible by an operator without exposing the operator to electrical hazards from main line-voltage components in the main line-voltage compartment 25 inside the motor control center unit 20. The troubleshooting compartment 1 provides flexibility in expanding or modifying feed-through terminals 40 contained therein and enables installing or modifying pilot devices 21 therein, such as pilot lights, push buttons, selector switches, or other control devices, both during the manufacture of customized motor control center units 20 and during field modification of motor control center units 20. The high power electrical components within the motor control center unit 20 may thus be safely tested without exposing the operator to an electrical hazard.

There are two example embodiments of the invention, both of which comprise an accessible troubleshooting compartment 1 contained within the motor control center unit 20, which is separate from the main line-voltage compartment 25 of the motor control center unit 20. In both embodiments, the troubleshooting compartment 1 includes a hinged door 4 covering an access side 16 to the troubleshooting compartment 1 from the front side 67 of the motor control center unit 20, to enable operator access to the troubleshooting compartment 1 without need to open the main line-voltage compartment 25. In both embodiments, the troubleshooting compartment 1 includes a terminal block 2 inside it, with feed-through terminals 40 for test points and with pilot devices 21 operating at low, control voltages to avoid an electrical hazard.

Figure 1A:
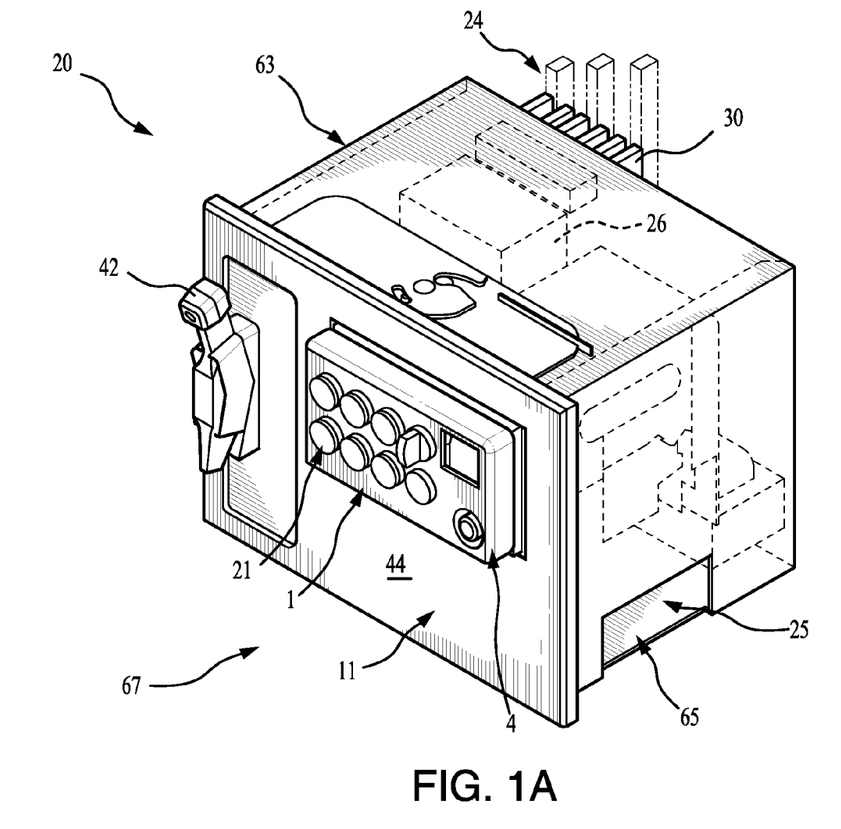
FIG. 1A is a perspective view from the top right side of an example embodiment of the invention in a motor control center unit, illustrating a first example embodiment of the trouble shooting compartment with the compartment door being mounted by a hinge on the compartment structure that is mounted in the front door of the motor control center unit, the figure showing the compartment door closed.

FIG. 1A is a perspective view from the top right side of an example embodiment of the invention in a motor control center (MCC) unit 20. The MCC unit 20 may contain electrical components, such as circuit breakers 26, motor starters, relays, power meters, programmable logic controllers, and other control circuit components used for electrical power distribution in industrial and commercial applications. The MCC unit 20 slides into an MCC section and plugs into a common power bus 24 running vertically along the back side of the MCC section. The MCC unit 20 includes a stab assembly or stabs 30, arranged on the back side of the MCC unit 20, to plug into the power bus 24. The on/off handle 42 controls the on/off state of the circuit breaker 26. The figure illustrates a first example embodiment of the trouble shooting compartment 1. The troubleshooting compartment door 4 is mounted by a hinge 9 on the troubleshooting compartment structure 15 (shown in FIG. 1C) that is mounted in the MCC unit front door 11 of the MCC unit 20, the figure showing the compartment door 4 closed.

In the first example embodiment of the invention, a troubleshooting compartment structure 15 has a generally box-like shape mounted in an aperture 17 of a front door 11 of the motor control center unit 20, the access side 16 of the troubleshooting compartment structure 15 being accessible by an operator through the troubleshooting compartment door 4. The troubleshooting compartment structure 15 is configured to provide separation and protection from high power components inside the main line-voltage compartment 25 of the motor control center unit 20. Desirably, the troubleshooting compartment structure 15 is mounted tenaciously in the aperture and seals the aperture, so as to minimize the escape of arc blast or debris therefrom from the inside of the enclosure, if an arcing event were to occur.

Figure 1B:
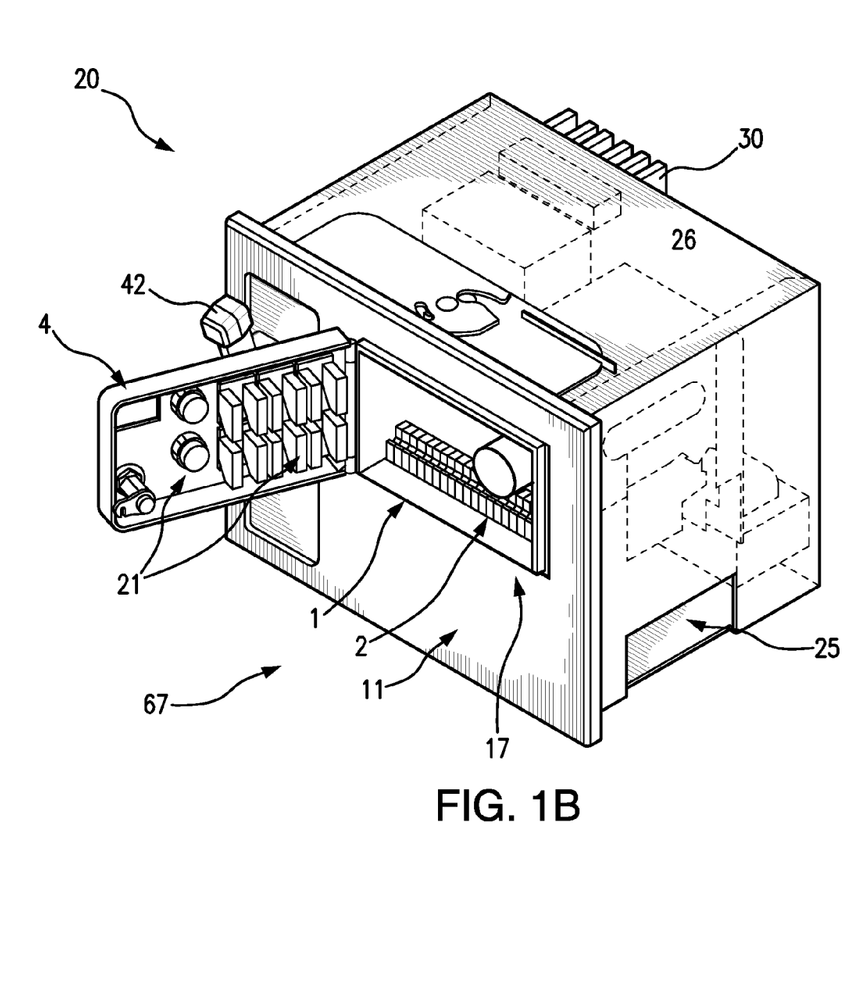
FIG. 1B is a perspective view from the top right side of the example embodiment of the invention shown in FIG. 1A, the figure showing the compartment door open, revealing the feed-through electrical terminals being mounted on an electrical terminal block inside the compartment structure, to be accessible by the operator.

FIG. 1B is a perspective view from the top right side of the example embodiment of the invention shown in FIG. 1A, the figure showing the troubleshooting compartment door 4 open, revealing the feed-through electrical terminals being mounted on an electrical terminal block 2 inside the troubleshooting compartment structure 15, to be accessible by the operator through the aperture 17 in the unit front door 11 of the motor control center unit 20.

In the first example embodiment of the invention, the troubleshooting compartment door 4 is mounted by a hinge 9 on the troubleshooting compartment structure 15 that is permanently mounted by means of welding, adhesives, and/or fasteners, in the front door 11 of the motor control center unit 20, through the aperture 17. The troubleshooting compartment door 4 is configured to be opened by the operator independently from the front door 11 of the motor control center unit 20.

Figure 1C:
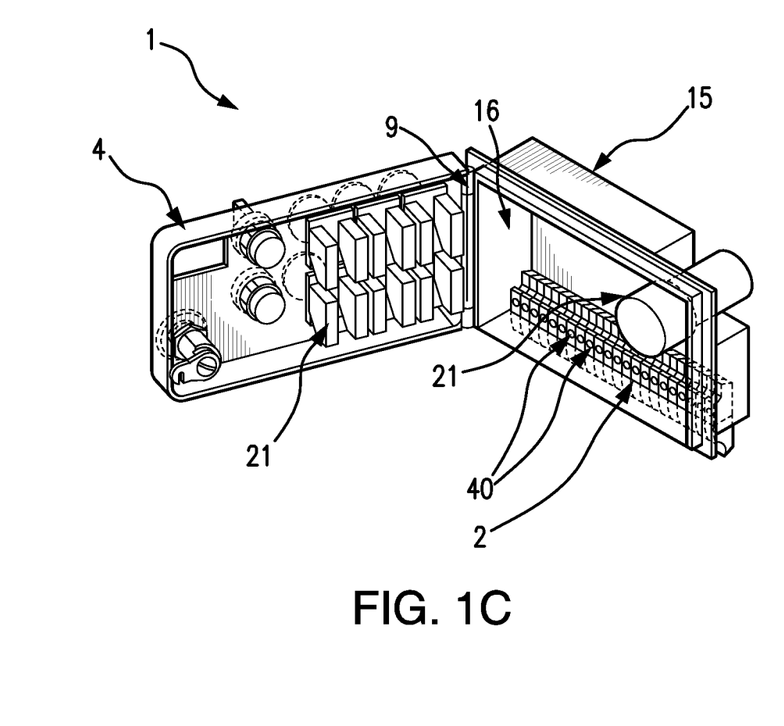
FIG. 1C is a perspective view from the top right side of the example embodiment of the invention shown in FIG. 1A, the figure showing the troubleshooting compartment structure having a generally box-like shape with one side being the access side, the compartment structure being mounted in an aperture of the front door of the motor control center unit.

FIG. 1C is a perspective view from the top right side of the example embodiment of the invention shown in FIG. 1A, the figure showing the troubleshooting compartment structure 15 having a generally box-like shape with one side being the access side 16. The composition of the troubleshooting compartment structure 15 should be machinable to enable customization for installing or modifying pilot devices and it should have good structural integrity to resist the explosive effects of an arc flash. The troubleshooting compartment structure 15 may, for example, be a metal, for example steel or aluminum, an injection molded thermoplastic such as a polycarbonate (for example, Lexan™) or a thermoset plastic composite, such as an epoxy-glass.

In the first example embodiment of the invention, a plurality of feed-through electrical terminals 40 are mounted on an electrical terminal block 2 in the troubleshooting compartment structure 15, configured to be accessible by the operator and provide remote electrical access to test control points of high power electrical components inside the motor control center unit 20, without exposing the operator to electrical hazards from the high power electrical components inside the motor control center unit 20, while the unit front door 11 remains closed.

Figure 1D:
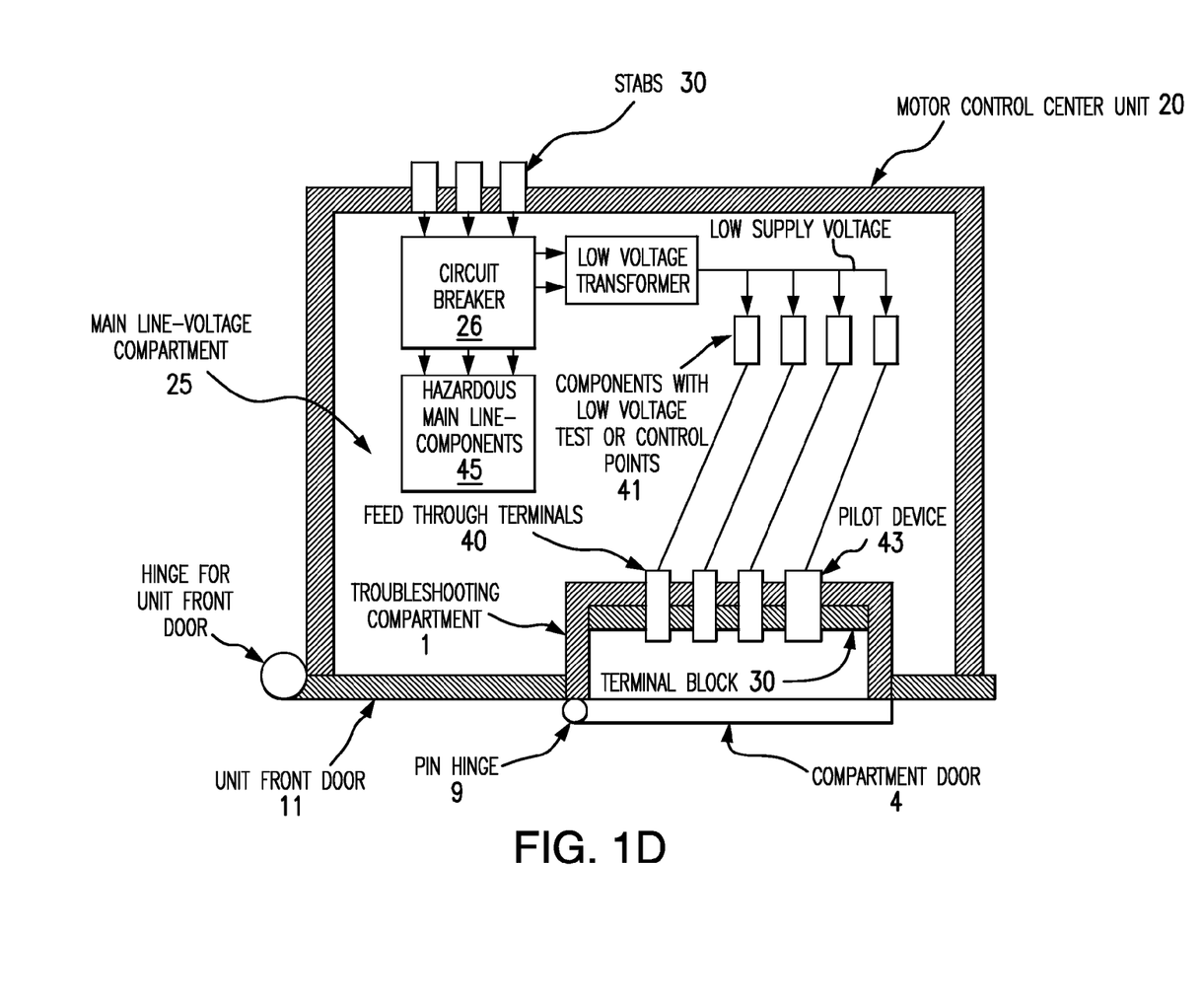

FIG. 1D is a generalized circuit schematic diagram and top cross sectional view of an example embodiment of the invention shown in FIG. 1A, the figure showing the troubleshooting compartment structure 15 having a generally box-like shape with one side being the access side 16. The troubleshooting compartment structure 15 is mounted in the aperture 17 of the front door 11 of the motor control center unit 20. The unit front door 11 is shown mounted by means of a hinge on the motor control center unit 20. The schematic shows example feed-through electrical terminals 40 that are mounted on the electrical terminal block 2 inside the troubleshooting compartment structure 15. The feed-through electrical terminals 40 are connected to components with low voltage test or control points 41 inside the main line-voltage compartment 25, without exposing the operator to electrical hazards from the main line-voltage components 45 inside the motor control center unit 20.

Feed-through terminals 40 may be metal conductors connected to low voltage test points 41 within the main line-voltage compartment 25. Feed through terminals 40 pass through the wall of the troubleshooting compartment 1 and present a contacting surface that is available for probing with an instrument, such as a frequency counter or voltmeter. The figure further schematically shows example pilot device 21 being mounted on the electrical terminal block 2 inside the troubleshooting compartment structure, connected to test control points 41 inside the main line-voltage compartment 25, without exposing the operator to electrical hazards from the main line-voltage components 45 inside the motor control center unit. Pilot devices 21 are low voltage devices that may include pilot lights, push buttons, selector switches, or other control devices connected to low voltage test points 41 within the main line-voltage compartment 25. The pilot devices 21 may be options and configurations chosen by customers or engineers to monitor or control the main line-power components 45 in the motor control center unit 20.

The troubleshooting compartment 1 provides flexibility in expanding or modifying feed-through terminals 40 contained therein and enables installing or modifying pilot devices 21 therein, such as pilot lights, push buttons, selector switches, or other control devices, both during the manufacture of customized motor control center units 20 and during field modification of motor control center units 20. In this manner, the electrical components within the main line-voltage compartment 25 may thus be safely tested without exposing the operator to an electrical hazard.

Figure 2A:
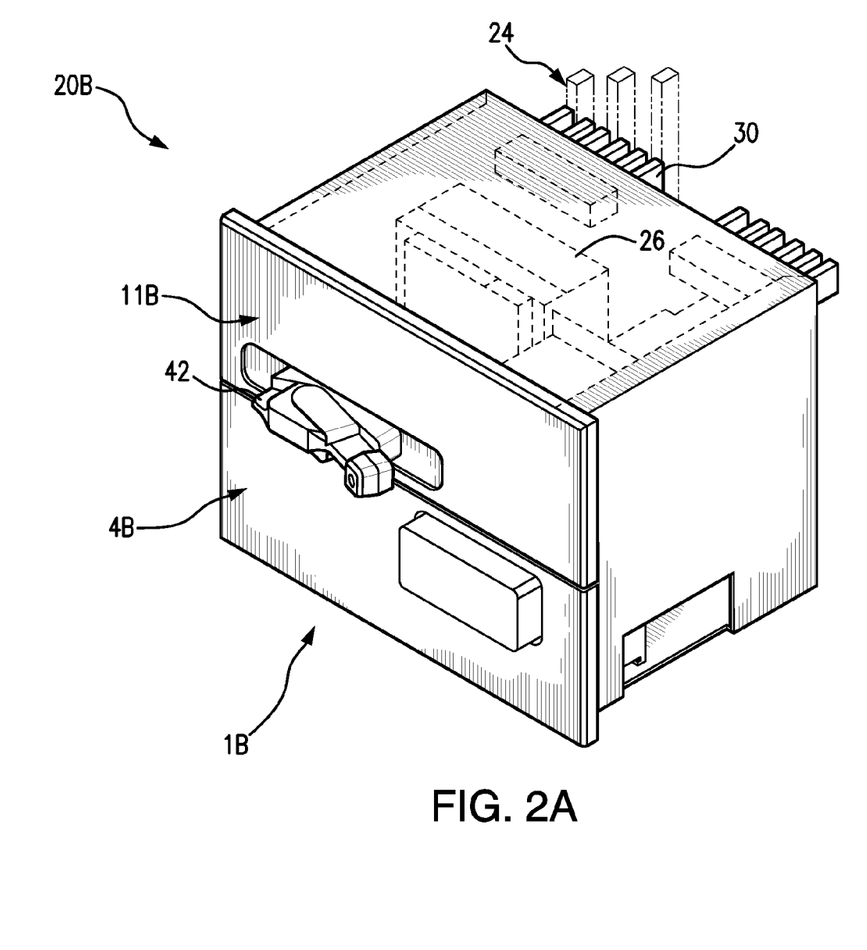
FIG. 2A is a perspective view from the top right side of a second example embodiment of the invention in a motor control center unit, illustrating a troubleshooting compartment is formed by a compartment divider dividing the motor control center unit into two compartments, namely the main line-voltage compartment and the accessible compartment that is separate from the main line-voltage compartment, the figure showing the compartment door closed.
Figure 2B:
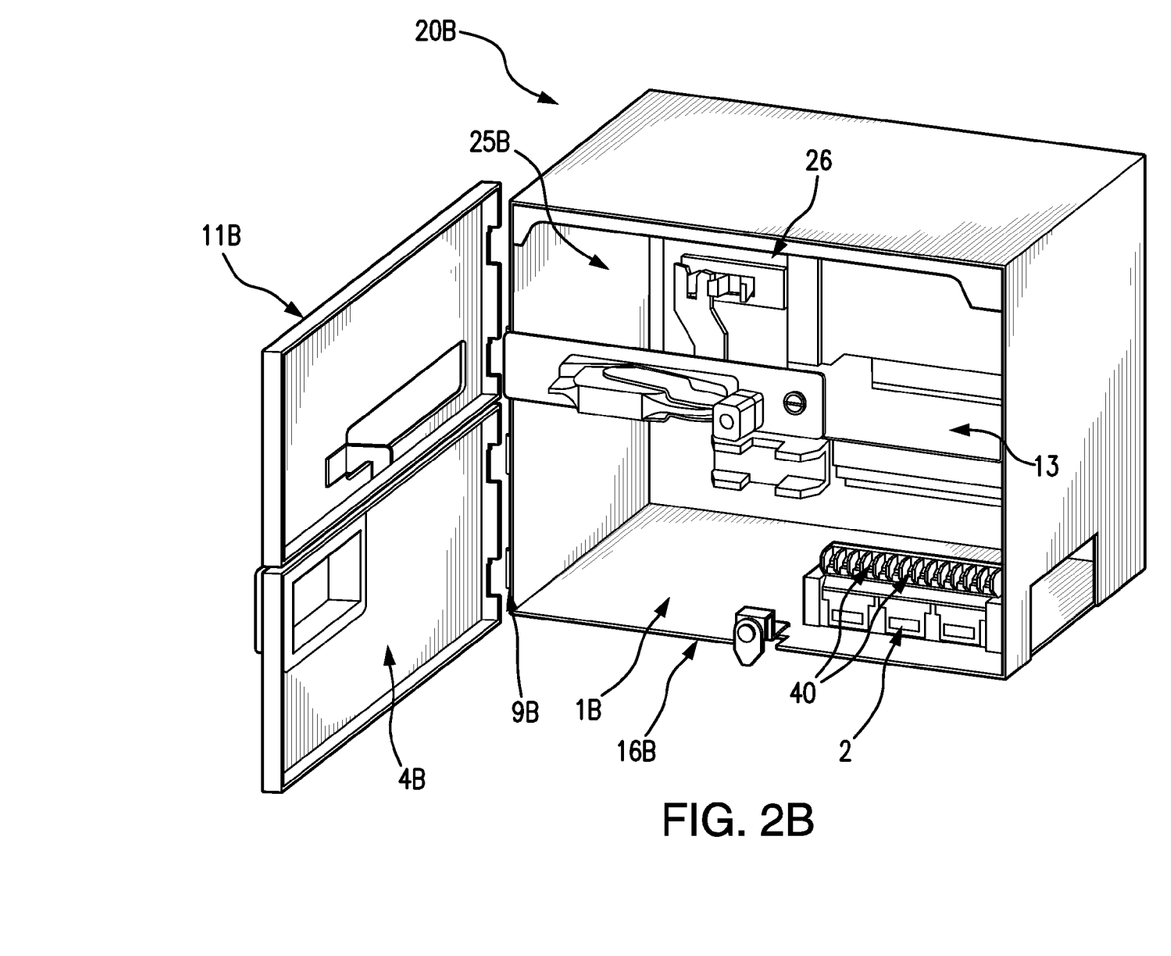
FIG. 2B is a perspective view from the top right side of the example embodiment of the invention shown in FIG. 2A, the figure showing the compartment door open, revealing the feed-through electrical terminals being mounted on an electrical terminal block inside the compartment structure, to be accessible by the operator through the compartment door.

FIG. 2A is a perspective view from the top right side of a second example embodiment of the invention in a motor control center unit 20B, illustrating a troubleshooting compartment 1B is formed by a compartment divider 13, shown in FIG. 2B, dividing the motor control center unit 20B into two compartments, namely the main line-voltage compartment 25B and the accessible troubleshooting compartment 1B that is separate from the main line-voltage compartment 25B. FIG. 2A shows the troubleshooting compartment door 4B closed and FIG. 2B shows the troubleshooting compartment door 4B open.

In the second example embodiment of the invention of FIGS. 2A and 2B, the motor control center unit 20B is divided into two compartments, the troubleshooting compartment 1B and the main line-voltage compartment 25B, both having a respective and mutually independent front door 4B and 11B. The troubleshooting compartment 1B has a generally box-like shape with an access side 16B in the front of the motor control center unit 20B, the access side 16B of the troubleshooting compartment 1B being accessible by an operator at the front of the motor control center unit 20B. The troubleshooting compartment 1B is configured by means of the compartment divider 13 to provide separation and protection from hazardous high power electrical power components in the main line-voltage compartment 25B of the motor control center unit 20.

In the second example embodiment of the invention, the troubleshooting compartment door 4B is mounted by a hinge 9B on the front of the motor control center unit 20B, covers the access side 16B, and is configured to be opened by the operator independently from the front door 11B of the main line-voltage compartment 25B.

In the second example embodiment of the invention, a plurality of feed-through electrical terminals 40 are mounted on an electrical terminal block 2 in the troubleshooting compartment 1B. The plurality of feed-through electrical terminals 40 are configured to be accessible by the operator through the access side 16B in the front of the motor control center unit 20B when the troubleshooting compartment door 4B is opened, to provide electrical access to test control points of high power electrical components of the main line-voltage compartment 25B, without exposing the operator to electrical hazards from the high power inside the main line-voltage compartment 25B.

The troubleshooting compartment 1B provides flexibility in expanding or modifying feed-through terminals 40 contained therein and enables installing or modifying pilot devices 21 therein, such as pilot lights, push buttons, selector switches, or other control devices, both during the manufacture of customized motor control center units 20B and during field modification of motor control center units 20B. In this manner, the electrical components within the motor control center unit may thus be safely tested without exposing the operator to an electrical hazard.

Although specific example embodiments of the invention have been disclosed, persons of skill in the art will appreciate that changes may be made to the details described for the specific example embodiments, without departing from the spirit and the scope of the invention.

What is claimed is:

1. A troubleshooting compartment for a motor control center unit, comprising:
    an accessible compartment contained within a motor control center unit, which is separate from a main line-voltage compartment of the motor control center unit, the accessible compartment having an access side to enable operator access to the accessible compartment without need to open the main line-voltage compartment;
    an accessible compartment door hinged on a front side of the motor control center unit and covering the access side of the accessible compartment; and
    feed-through terminals mounted inside the accessible compartment, for test points or pilot devices or both, operating at low, control voltages to avoid an electrical hazard.

2. The troubleshooting compartment for a motor control center unit of claim 1, wherein the accessible compartment further comprises:
    a) a compartment structure having a generally box-like shape with one side being the access side, the compartment structure being mounted in an aperture of a front door of the motor control center unit, the compartment structure being configured to provide separation and protection from electrical hazards inside the motor control center unit;
    b) the accessible compartment door being mounted by a hinge on the compartment structure, the accessible compartment covering the aperture in the front door of the motor control center unit, the accessible compartment door being configured to be opened by the operator independently from the front door of the motor control center unit; and
    c) the feed-through electrical terminals being mounted on an electrical terminal block inside the compartment structure, the feed-through electrical terminals being configured to be accessible by the operator to provide electrical access to the test points or pilot devices, or both, inside the motor control center unit, without exposing the operator to electrical hazards from the main line-voltage compartment.

3. The troubleshooting compartment for a motor control center unit of claim 1, wherein the accessible compartment further comprises:
    a) a compartment divider forming one side of the accessible compartment, the compartment divider dividing the motor control center unit into two compartments, namely the main line-voltage compartment and the accessible compartment that is separate from the main line-voltage compartment, the compartment divider being configured to provide separation and protection of the accessible compartment from electrical hazards from the main line-voltage compartment;
    b) the accessible compartment door being mounted by a hinge at the front side of the motor control center unit, the accessible compartment door covering the access side of the accessible compartment, and being configured to be opened independently from a front door of the main line-voltage compartment; and
    c) the feed-through electrical terminals being mounted on an electrical terminal block inside the accessible compartment, the feed-through electrical terminals being configured to be accessible by the operator through the opened accessible compartment door, to provide electrical access to the test points or pilot devices, or both, inside the motor control center unit, without exposing the operator to electrical hazards from the main line-voltage compartment.

* * * * *